Dec. 17, 1957 W. H. GOMEZ ET AL 2,816,443
DIFFERENTIAL PRESSURE SENSITIVE APPARATUS
Filed March 15, 1954

INVENTORS
WILLIAM E. BAKER
WILLIAM H. GOMEZ
BY Tyler & Roundy
ATTORNEY

United States Patent Office 2,816,443
Patented Dec. 17, 1957

2,816,443
DIFFERENTIAL PRESSURE SENSITIVE APPARATUS

William H. Gomez, Bronx, N. Y., and William E. Baker, Wellesley, Mass., assignors to Bendix Aviation Corporation, Teterboro, N. J., a corporation of Delaware Application March 15, 1954, Serial No. 416,078

4 Claims. (Cl. 73—407)

This invention relates to pressure sensitive apparatus and particularly to apparatus employing flexible diaphragm means responsive to a difference in two pressures.

When a pair of bellows or diaphragms is utilized to obtain a mechanical displacement which is a function of the difference between two pressures difficulty has been experienced heretofore in providing apparatus which will produce the desired accurate relationship between output displacement and the difference in pressure and which also will facilitate a relatively simple analysis for deriving the actual deflection characteristic or performance curve for the particular apparatus.

In one prior construction a pair of flexible differential pressure tubes were rigidly attached along adjoining portions throughout their lengths to a common restraining member provided so as to prevent longitudinal expansion of the pressure tubes. In such construction the attachment of the member to the longitudinal portions of the tubes produces a non-linear loading of the convolutions of the tubes so that the center of rotation or pivot axis for the assembly shifts with different differential pressure values over an operating range, thereby producing an output displacement which is not proportional to the value of the differential pressure over the operating range of differential pressure values.

It is an object of the present invention to provide apparatus which accurately translates two pressures into a displacement in accordance with a predetermined desired relationship.

It is another object of the present invention to provide differential pressure apparatus which lends itself to a relatively simple deflection analysis.

It is another object of the present invention to provide apparatus capable of producing a displacement which is a linear function of the difference between two pressures.

It is a further object of the present invention to provide differential pressure apparatus utilizing a pair of rockable diaphragm means with flexible cantilever means in such a manner that the effective pivot axis about which the diaphragm means rocks does not shift with different differential pressure values.

It is a further object of the present invention to provide differential pressure apparatus utilizing a pair of pivotable diaphragm means with associated flexible cantilever means and novel zero-adjustment means adapted to permit intial pivotal adjustment of the diaphragm means and cantilever means.

It is still a further object of the present invention to provide differential pressure apparatus utilizing a pair of pivotable diaphragm means associated with readily replaceable cantilever spring means.

It is still a further object of the present invention to provide differential pressure apparatus having greater sensivity and improved operating characteristics.

The above and other objects and advantages of the present invention will appear more fully hereinafter from a consideration of the detailed description which follows, taken together with the accompanying drawing, wherein specific embodiments of the invention are illustrated, in which.

Figure 8:
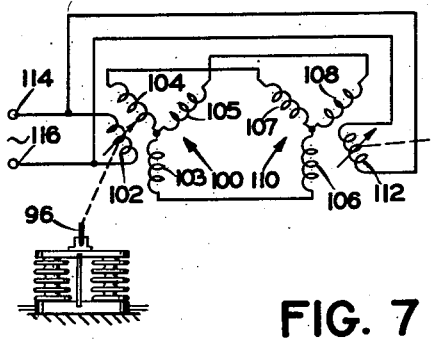
Figure 7:
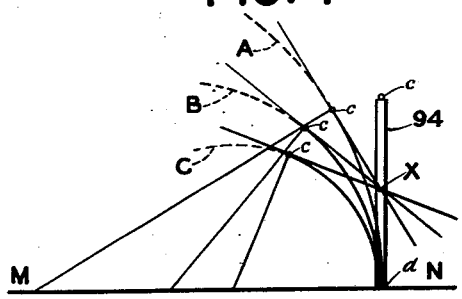

Fig. 7 depicts graphically the mode of operation of the cantilever spring means employed in the apparatus of Fig. 1, 2, 3, and 4 and demonstrates graphically how the effective pivot axis is prevented from shifting in accordance with a feature of the present invention; and Fig. 8 illustrates schematically electrical servo-mechanism indicating apparatus controlled by a differential pressure device in accordance with the present invention.

Figure 1:
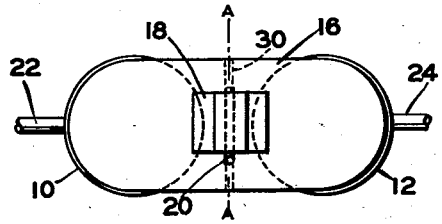
Fig. 1 is a plan view of one form of differential pressure apparatus according to the present invention.
Figure 2:
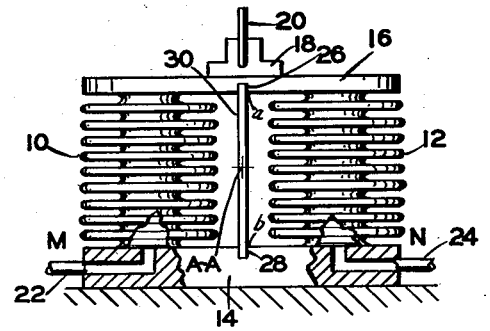
Fig. 2 is a side view, partly in section, of the apparatus of Fig. 1.

Referring to the simplified showing of Figs. 1 and 2, there is provided one form of apparatus for deriving an output displacement which is proportional to the difference between the magnitudes of two pressures. A pair of identical flexible metal bellows 10 and 12 have their fixed ends secured hermetically to a stationary support member 14. A metal cover member 16 hermetically seals off the movable ends of the pair of bellows and rigidly connects them together. A motion take-off member 18, carrying a motion take-off pin 20, is rigidly secured to the central portion of the connecting cover 16.

A conduit 22 supplies a pressure fluid to the interior of the bellows 10 and a conduit 24 supplies a pressure fluid to the interior of the bellows 12. One pressure fluid may be air at ambient or atmospheric pressure and the second pressure fluid may be air or a liquid, such as oil or fuel, at a different pressure, in which case an output displacement of pin 20 will be obtained which is a function of gage pressure, that is the difference between the second pressure and the ambient or atmospheric pressure. Alternatively, both pressure fluids may be liquids, in which case the output displacement of pin 20 will be a function of the difference between the pressures of the two liquids. In certain applications it may be desirable to maintain a vacuum in one of the bellows, in which case the output displacement of pin 20 will be a function of the absolute pressure of the fluid in the other bellows.

Rigidly secured in slots 26 and 28 provided in the connecting cover 16 and support member 14 are the top and bottom ends of a flexible cantilever member 30. Member 30 is a relatively thin metal blade or leaf spring serving as a centilever beam freely suspended between the connecting cover 16 and support member 14 in the sense that member 30 is maintained out of contact with the corrugations of the pair of bellows and with any other loading element. When the pressures in the two bellows are equal, the pair of bellows exert equal and opposite forces to balance each other so that the bellows are in unflexed vertical position as shown, which is also true of cantilever spring member 30 which lies in a plane perpendicular to the support member 14 and perpendicular to the plane which includes the longitudinal axes of the pair of bellows.

When the pressure changes in one or both of the bellows so that there is a net difference in pressure, then the forces exerted by the pair of bellows become unequal. Assuming that bellows 12 is subjected to the greater pressure, then the pair of bellows interconnected by cover 16 and take-off pin 20 will rock or pivot together with the cantilever strip 30 in a left-hand direction about an effective pivot axis A—A which lies in the plane of strip 30 midway between the pair of bellows and parallel to the support structure 14. Axis A—A is located halfway between the effective top and bottom ends, points a and b respectively, of strip 30. The magnitude of the pivotal displacement, which includes the displacement of pin 20, is directly proportional to the magnitude of the difference between the two pressures over a given operating range of differential pressures, the greater the differential pressure the greater the displacement of the motion take-off pin 20. It will be appreciated that this output displacement is in a left-hand direction generally perpendicular to the plane of strip 30. Of course, if the pressure in bellows 10 should instead exceed the pressure in bellows 12, then the rocking or pivoting movement will be in the right-hand direction generally perpendicular to the plane of strip 30, the displacement of pin 20 still being proportional to the difference in pressure over the operating range of differential pressures.

Figure 3:
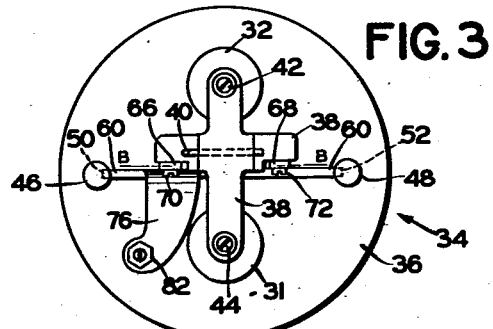
Fig. 3 is a plan view of a preferred form of differential pressure apparatus according to the present invention.
Figure 4:
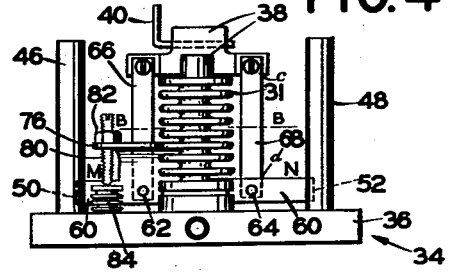
Fig. 4 is a side view of the apparatus of Fig. 3.

In Figs. 3 and 4 there is provided another form of differential pressure apparatus according to the invention. A pair of identical flexible metal bellows 31 and 32 have their fixed bottom ends secured to the stationary portion 36 of a support structure 34. Bellows 31 and 32 are provided with individual top and bottom cover plates for hermetically sealing each bellows. Bellows 31 and 32 may be supplied with different pressure fluids in a manner similar to Figs. 1 and 2. Rigidly connecting the movable top ends of bellows 31 and 32 is a member 38 which has an embedded motion take-off pin 40. For example, the connecting member may be secured by screws 42 and 44 to the respective top cover plates of bellows 31 and 32.

Rigidly secured to the stationary base portion 36 are a pair of rigid posts 46 and 48. Rigidly secured in slots 50 and 52 provided in the posts 46 and 48, respectively, is a torsion spring metal strip member 60, shown in detail in Fig. 5, which serves as an adjustable support portion of the support structure 34. Rigidly secured to the torsion spring 60 by screws 62 and 64 are the bottom ends of a pair of flexible cantilever spring strips 66 and 68. The top ends of strips 66 and 68 are rigidly secured by screws 70 and 72 to respective surfaces recessed in the connecting member 38. Strips 66 and 68 lie in a plane which substantially coincides with the plane of torsion strip 60 which is midway between the pair of bellows.

When the pressures in the pair of bellows are equal, the forces exerted by the pair of bellows will be equal and opposing so that the pair of bellows and the strips 66 and 68 will remain undeflected in an upright vertical position. Assuming that the pressure in bellows 32 now exceeds the pressure in bellows 31, the pair of bellows and the strips 66 and 68 will now rock or pivot about an effective pivot axis B—B in a downward direction as viewed in Fig. 3 until a new equilibrium position is reached. The operation is substantially the same as the operation of the apparatus of Figs. 3 and 4. The displacement of take-off pin 40 will again be proportional to the difference in pressures, and the direction of displacement will depend upon which bellows receives the larger pressure. Just as in Figs. 1 and 2, the effective pivot axis B—B will not shift with changes in differential pressure over the operating range and hence the output deflection or displacement characteristic will remain linear.

The effective lengths of strips 66 and 68 is between points c and d.

Figure 5:
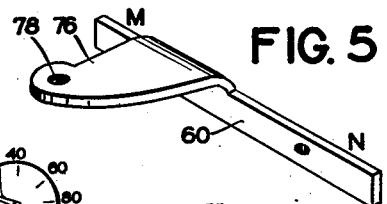
Fig. 5 is an isometric detailed view of the torsion spring adjustable support member incorporated in the apparatus of Figs. 3 and 4.
Figure 6:
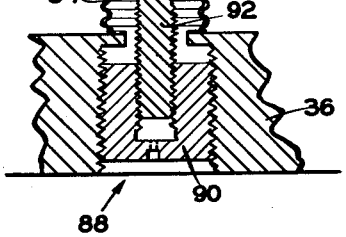
Fig. 6 is a sectional side view showing in detail the differential screw arrangement incorporated in the apparatus of Figs. 3 and 4.

As shown more clearly in Fig. 5, the torsion strip 60 has a projecting lip portion 76 with a threaded aperture 78 in which is threaded an elongated screw 80 provided with a lock nut 82. The lip portion 76 with its screw 80 is adapted to engage the movable top end of a third bellows 84 forming part of a novel zero-adjustment mechanism including a differential screw device 88 shown in detail in Fig. 6. The pitch of the outer threads on portion 90 and on base 36 is less than the pitch of the inner threads on position 90 and on shank 92 secured to the top end of bellows 84. When it is desired to effect zero-adjustment of pin 40 and whatever it controls, portion 90 is rotated by a screw driver so as for example to advance shank 92 upward and thereby expand the bellows 84. The lip portion 76 is thus raised which causes torsion spring 60 to twist about its longitudinal axis thereby producing pivotal movement of the pair of bellows and the strips 66 and 68 about axis B—B until the necessary displacement of pin 40 has been obtained. When the adjustment of portion 90 is completed, the pair of bellows and strips 66 and 68 will remain locked in their adjusted pivoted positions. Torsion strip 60 has sufficient strength so that it is not deflected vertically or laterally.

Fig. 7 demonstrates graphically the fact that the pivot axis A—A of the device of Figs. 1 and 2 and the pivot axis B—B of the device of Figs. 3 and 4 do not shift with changes in differential pressure. For purposes of illustration, the proportions in Fig. 7 have been somewhat exaggerated. The effective length of the cantilever spring means is represented at 94 and will be treated as one strip for discussion purposes. For each progressively larger value of differential pressure in one direction, the spring strip 94 flexes to the left and conforms to the arc of a different circle of a family of circles of progressively smaller radius, as indicated by the family of partial circles A, B and C each of which has its center lying on the base line M—N. The base line M—N corresponds to the level M—N of base 14 in Fig. 2 and to the level M—N of the top edge of torsion strip 60 in Fig. 4. Point c represents the effective top end of strip 94.

It will be seen that when a tangent is drawn to the circumference of each circle at point c perpendicular to its radius, each tangent will pass through the same point X in space which is half way between the effective ends c and d of strip 94 when in its unflexed position. Point X will be recognized as being located at precisely the same point in space as are the effective pivot axes A—A and B—B.

Similarly, if the relative magnitudes of the pressures in the pair of bellows is reversed so that the bellows which had the larger pressure is instead subjected to the lower pressures, then for each progressively larger value of differential pressure in such reverse direction, spring strip 94 flexes to the right and conforms to the arc of a different circle of a family of circles of progressively smaller radius on the right-hand side of strip 94 in Fig. 7. Once again all of the tangents to these circles at the point c pass through the same point X shown in Fig. 7.

In the differential pressure indicator electrical servomechanism illustrated in Fig. 8 the motion take-off pin 96 of a differential pressure device 98, which may be similar to the device of Figs. 1 and 2 or Figs. 3 and 4, is coupled through suitable gearing, sectors and linkages (not shown) to the rotor of a synchro transmitting device 100. The stator windings 103, 104 and 105 are connected "back-to-back" in the usual manner to the corresponding stator windings 106, 107 and 108 of a remote indicator synchro device 110. The rotor windings 102 and 112 of synchro devices 100 and 110 are connected across a pair of terminals 114, 116 which in turn are connected to a suitable source of alternating current.

The rotor of the indicator synchro device 110 is coupled to displace the pointer 118 on an indicator dial 120 which is suitably calibrated linearly in units of differential pressure. If one of the two differential pressures is ambient air pressure or atmospheric pressure, the dial may be calibrated in units of gage pressure. If one of the diaphragm means is subjected to a vacuum, the dial may be calibrated in units of absolute pressure.

In operation, where there are equal pressures in the pair of diaphragm means and the take-off pin has been zero-adjusted to its upright position, then the rotors of the transmitter and indicator synchro devices will each be in a null position with respect to the stator windings and the pointer 118 will register zero differential pressure. When a difference in the two pressures occurs, then the pivotal displacement imparted to pin 96 will cause the transmitter rotor to be angularly displaced, resulting in an unbalance of stator voltages which in the usual manner causes the rotor of the indicator synchro device to assume the same rotary position as the transmitter rotor. Pointer 118 in turn will accurately indicate the magnitude of the difference in pressure. If it is desired to measure differential pressures which may vary in both directions, then dial 120 may of course be provided with linear calibrations on both sides of the zero differential pressure mark.

The apparatus shown in Figs. 1 and 2 and in Figs. 3 and 4 may be hermetically sealed in a casing which may be evacuated or may contain air or an inert gas at atmospheric pressure. In each instance, both of the identical bellows are exposed to the same pressure surrounding the outside of the corrugations.

It has been found that cantilever spring strips composed of an alloy of nickel, chromium and iron yield satisfactory operation. Working with a range of differential pressures between zero and a maximum in the order of 100 p. s. i., it has been found that the following approximate dimensions for the apparatus of Figs. 3–5 give especially satisfactory results in an aircraft application: 0.562 inch outside diameter and 0.50 inch height for bellows 30 and 32 at sea level; bellows separation of 0.875 inch center-to-center; 0.50 inch effective length (from c to d), 0.032 inch thickness and 0.187 inch width for cantilever strips 66 and 68; 0.050 inch thickness and 0.25 inch height for torsion strip 60.

Although certain specific embodiments of the invention have been illustrated and described in detail by way of example, it is to be expressly understood that the invention is not limited thereto. For example, although the take-off pin 40 in Figs. 3 and 4 is shown in Fig. 3 as lying in a parallel plane somewhat behind the plane of strips 66 and 68, pin 40 may instead be located so as to lie in the same plane as strips 66 and 68 and the pivot axis B—B. Similarly, the torsion strip 60 may preferably have off-set portions near each end and of less thickness than the rest of strip 60 so that only the off-set portions are subjected to torsional stress and so that the off-set portions will lie in the same plane as the strips 66 and 68 and the pivot axis B—B.

The phrase "a pair of flexible diaphragm means" employed in the specification and claims is to be understood to include not only a pair of pivotable flexible bellows but also a pair of pivotable flexible diaphragms each mounted side-by-side on a separate hollow base. Moreover, where desired the cantilever means may be relocated with respect to the bellows so that the effective pivot axis is located other than half way between the ends of each bellows. Specific dimensions and organizations of elements have been given simply by way of example. Various changes may be made in the design and arrangement of the elements without departing from the spirit and scope of the invention as defined by the appended claims, as will now be understood by those skilled in the art.

What is claimed is:

1. In differential pressure apparatus for deriving a displacement which is a function of the difference between two pressures, a support structure having a stationary portion and an adjustable portion supported by said stationary portion, a pair of flexible rocking bellows mounted side-by-side with their fixed ends secured to said adjustable portion and each bellows adapted to be subjected to a different one of said pressures, a structure for rigidly connecting together the movable ends of said pair of bellows, cantilever spring means lying, when undeflected, substantially in a plane between said pair of bellows perpendicular to a plane including the longitudinal axes of said pair of bellows and conected between said connecting structure and said adjustable portion of said support structure so that said pair of bellows and said spring means are deflected generally perpendicularly to the plane of said spring means when a difference between said pressures occurs, zero-adjustment means including locking means for tilting said adjustable portion of said support structure and said pair of bellows and spring means in a direction generally perpendicular to the plane of said spring means, and said adjustable portion of said support structure including a torsion spring member lying in a plane substantially coinciding with the plane of said cantilever spring means and having its ends mounted on said stationary portion of the support structure.

2. Apparatus according to claim 1 wherein said zero-adjustment means includes a third bellows having its fixed end secured to said stationary portion of the support structure to seal hermetically an aperture therein and differential screw means threaded to said stationary portion and having an output member extending through said aperture and secured to the movable end of said third bellows to expand or contract said third bellows upon rotation of said differential screw means, said torison spring member having a portion adapted for displacement in response to the displacement of said third bellows so that said torsion spring member twists about its longitudinal axis to produce said tilting motion.

3. In differential pressure apparatus for deriving a displacement which is a function of the difference between two pressures, a support structure, a pair of expansible bellows pointed side-by-side with their fixed ends secured to said support, means for subjecting each bellows to a different one of said pressures, a connecting structure rigidly connecting the movable ends of said bellows, a cantilever spring connected between said support and said connecting structure at points in a plane between said bellows, said spring being capable of deflection perpendicular to the direction of expansion of said bellows in consequence to tilting of the connecting member relative to the support, and means for adjusting the initial deflection of said cantilever spring comprising a torsion spring connected in series between said cantilever spring and said support and means for adjusting the torsional deflection of said torsion spring.

4. In differential pressure apparatus for deriving a displacement which is a function of the difference between two pressures, a support structure, a pair of expansible bellows mounted side-by-side with their fixed ends secured to said support, means for subjecting each bellows to a different one of said pressures, a connecting structure rigidly conecting the movable ends of said bellows, a cantilever spring fixed at one end to said connecting structure at a point in a plane intermediate said bellows and fixed at its other end to said support through a torsion spring, said cantilever spring being capable of deflection perpendicular to the direction of expansion of said bellows in consequence to tilting of the connecting member relative to the support, and means for adjusting the initial deflection of said cantilever spring comprising means for adjusting the torsional deflection of said torsion spring.

References Cited in the file of this patent

UNITED STATES PATENTS

| | | |
|---|---|---|
| 2,079,069 | Johnson | May 4, 1937 |
| 2,223,640 | Rineer | Dec. 3, 1940 |
| 2,340,008 | Matuszak | Jan. 25, 1944 |
| 2,391,916 | Newell | Jan. 1, 1946 |
| 2,427,249 | Birch | Sept. 9, 1947 |
| 2,441,044 | Tate | May 4, 1948 |
| 2,447,388 | Baak | Aug. 7, 1948 |
| 2,702,053 | Baker | Feb. 15, 1955 |
| 2,707,001 | Hathaway | Apr. 26, 1955 |
| 2,772,569 | Ruge | Dec. 4, 1956 |